(12) United States Patent
Hongthong et al.

(10) Patent No.: US 9,464,653 B2
(45) Date of Patent: Oct. 11, 2016

(54) CONCRETE WALL ANCHOR

(71) Applicants: Thanomsak Hongthong, Middle Island, NY (US); Seng Hongthong, Brentwood, NY (US)

(72) Inventors: Thanomsak Hongthong, Middle Island, NY (US); Seng Hongthong, Brentwood, NY (US)

(73) Assignee: THANOMSAK HONGTHONG, Middle Island, NY (US)

( * ) Notice: Subject to any disclaimer, the term of this patent is extended or adjusted under 35 U.S.C. 154(b) by 0 days.

(21) Appl. No.: 14/228,707

(22) Filed: Mar. 28, 2014

(65) Prior Publication Data

US 2015/0275950 A1 Oct. 1, 2015

(51) Int. Cl.
*F16B 13/12* (2006.01)

(52) U.S. Cl.
CPC .................... *F16B 13/126* (2013.01)

(58) Field of Classification Search
CPC . F16B 19/1081; F16B 13/063; F16B 13/126
USPC ........................ 411/45–48, 57.1, 60.1, 71, 73
See application file for complete search history.

(56) References Cited

U.S. PATENT DOCUMENTS

| | | | | |
|---|---|---|---|---|
| 575,282 | A * | 1/1897 | Cook | 411/80.5 |
| 688,756 | A * | 12/1901 | Tripp | 411/50 |
| 1,000,715 | A * | 8/1911 | Caywood | 411/57.1 |
| 1,799,245 | A | 4/1931 | Pleister | |
| 2,033,100 | A * | 3/1936 | Kellogg | 52/242 |
| 2,120,577 | A * | 6/1938 | Schulte | 411/71 |
| 2,139,167 | A | 12/1938 | Marshall | |
| 2,246,888 | A * | 6/1941 | Messenger | 411/58 |
| 2,353,851 | A * | 7/1944 | Rosan | 411/80.2 |
| 2,370,327 | A * | 2/1945 | Rosan | 411/80.2 |
| 2,470,924 | A * | 5/1949 | Flogaus | 411/80.6 |
| 2,887,002 | A | 5/1959 | McAfee | |
| 3,808,938 | A * | 5/1974 | Chromy | F16B 13/12 411/15 |
| 3,855,896 | A | 12/1974 | Kaufman | |
| 3,974,735 | A | 8/1976 | Berner | |
| 4,312,612 | A | 1/1982 | Thompson | |
| 4,482,277 | A | 11/1984 | Schiefer | |
| 4,720,224 | A | 1/1988 | Peterken | |
| 5,288,162 | A | 2/1994 | Bisping et al. | |
| 5,314,278 | A | 5/1994 | Weber | |
| 5,342,157 | A * | 8/1994 | Fischer | F16B 13/12 411/57.1 |
| 5,791,846 | A * | 8/1998 | Mayr | F16B 13/12 411/54.1 |
| 5,993,129 | A * | 11/1999 | Sato | 411/80.6 |
| 7,762,751 | B2 | 7/2010 | Panasik et al. | |
| 8,057,147 | B2 | 11/2011 | Ernst et al. | |
| 8,302,276 | B2 | 11/2012 | Kobetsky et al. | |
| 8,381,482 | B2 | 2/2013 | Lin et al. | |
| 8,404,065 | B2 | 3/2013 | Miller | |
| 8,465,239 | B2 * | 6/2013 | Armiento | B23B 51/08 411/45 |
| 8,544,228 | B2 | 10/2013 | Bronner | |
| 8,555,596 | B2 | 10/2013 | Hohmann, Jr. | |
| 2012/0045292 | A1 | 2/2012 | Kaye | |
| 2012/0257944 | A1 | 10/2012 | McDuff et al. | |
| 2012/0298765 | A1 | 11/2012 | Bosterling et al. | |
| 2012/0311947 | A1 | 12/2012 | Von Wissen | |
| 2013/0039715 | A1 | 2/2013 | Daykin et al. | |
| 2013/0074435 | A1 | 3/2013 | Hohmann, Jr. | |

\* cited by examiner

*Primary Examiner* — Flemming Saether
(74) *Attorney, Agent, or Firm* — Henry M. Feiereisen LLC.

(57) ABSTRACT

A concrete wall anchor has a hollow elongated body, a plurality of ribs extending along the body, and a plurality of spreadable anchoring legs narrowing laterally and downwardly, such that the driving tool can drive the anchor in a concrete wall, and the spreading tool can spread the anchoring legs in the concrete wall.

1 Claim, 3 Drawing Sheets

CONCRETE WALL ANCHOR

BACKGROUND OF THE INVENTION

The present invention generally relates to concrete wall anchors, and also to a system for their anchoring.

Concrete wall anchors are manufactured in great varieties and used for anchoring objects to concrete walls. Usually, a concrete wall anchor has a portion which is driven into a concrete wall and a portion which is used for supporting an object after the anchor has been driven into the concrete wall. Some known concrete wall anchors are disclosed in U.S. Pat. Nos. 1,799,245; 2,139,167; 3,855,896; 4,482,277; 4,720,224; 5,288,162; 5,314,278; 8,302,276; 8,381,482; 20120298765; 20120311947.

It is believed that the existing concrete wall anchors can be further improved as to their construction and manner of operation.

SUMMARY OF THE INVENTION

Accordingly it is an object of the present invention to provide a concrete wall anchor and a system for its anchoring which is a further improvement of the existing concrete anchors and anchoring systems.

In keeping with these objects and with others which will become apparent hereinafter, one feature of the present invention resides, briefly stated, in a concrete wall anchor which comprises an elongated body having an axis, upper and lower ends, and a substantially central opening extending in an axial direction; a plurality ribs projecting from an outer surface of said body, spaced from one another in a circumferential direction, and extending in a longitudinal direction of said body; and a plurality of anchoring legs extending downwardly from said lower end and spaced from one another in the circumferential direction, said central opening of said body having an upper part which is threaded so as to receive a threaded lower part of a driving tool constructed to drive the concrete anchor into concrete, said central opening having a remaining part constructed for passing a spreading tool into an area of said anchoring legs when the concrete anchor is in concrete and spreading said anchoring legs to reliably hold the concrete wall anchor in concrete.

The anchoring system in accordance with the present invention includes the concrete wall anchor constructed as described hereinabove, the driving tool, and the spreading tool.

The driving tool can include a lower threaded portion screwable into the threaded upper part of the central opening of the body, and an upper wider portion constructed for receiving downwardly directed blows for displacing the driving tool downwardly and thereby driving the concrete wall anchor into concrete. The spreading tool can be formed as a substantially cylindrical rod drivable through the central opening of the body into the area of the anchoring legs.

The ribs provided on the anchor body can reduce radially outwardly to a line. The anchoring legs can be formed so that in a non-spread position they abut centrally against one another at least at their lower ends. Each of the anchoring legs can have a lower parts reducing radially outwardly and also reducing downwardly The novel features of the present invention are set forth in the appended claims. The invention itself however as to its construction and it manner of operation will be best understood from the following description of the preferred embodiments which is accompanied by the following drawings.

DESCRIPTION OF THE PREFERRED EMBODIMENTS

Figure 1:
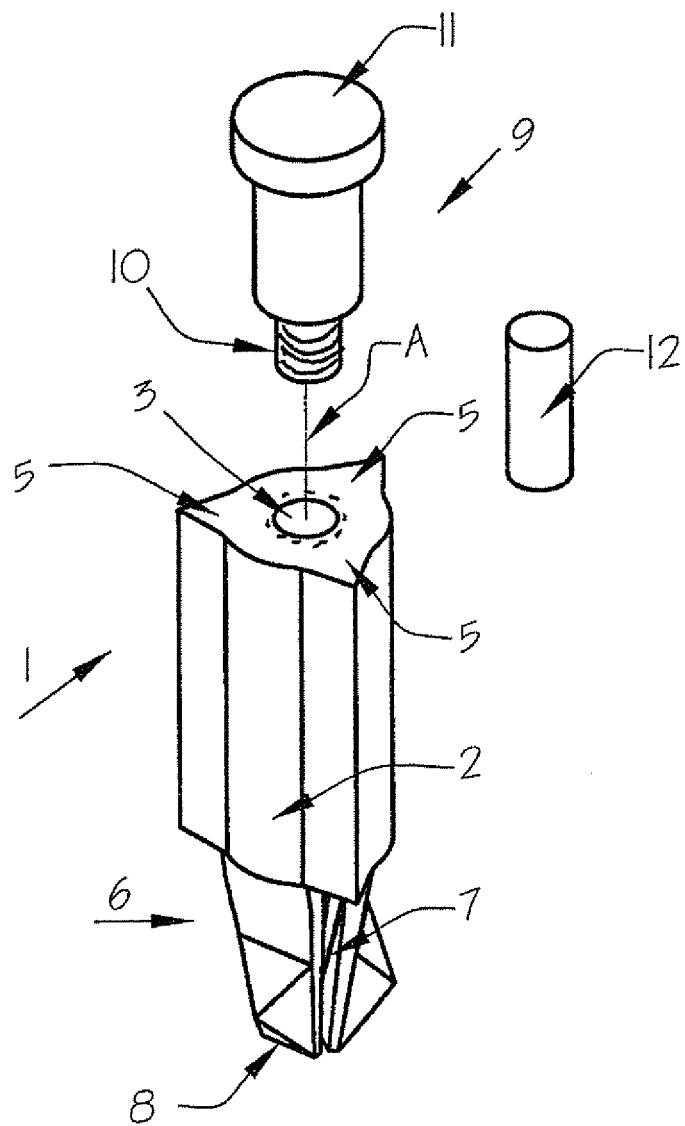
FIG. 1 is a perspective view of an anchoring system for a concrete wall anchor according to the present invention.
Figure 2:
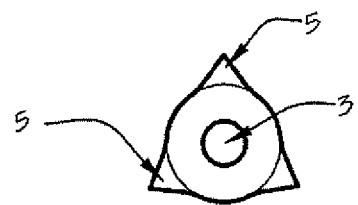
FIGS. 2, 3 and 4 are a top view, a cross section, and a bottom view of a concrete wall anchor according to the present invention.
Figure 3:
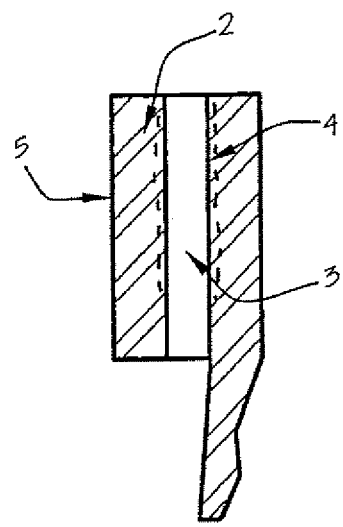
Figure 4:
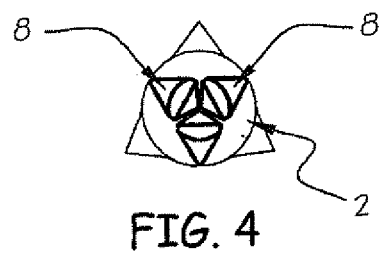
Figure 5:
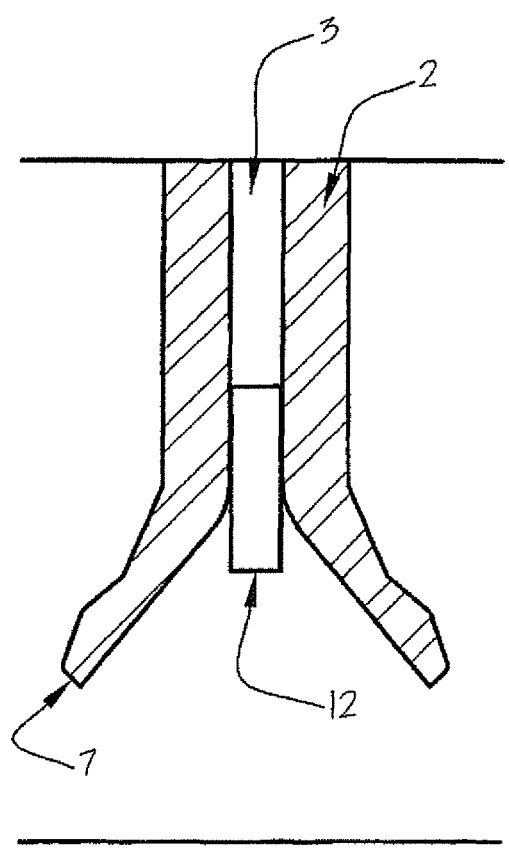
FIG. 5 is a view showing the inventive concrete wall anchor which is anchored in a concrete wall.

An anchoring system in accordance with the present invention has a concrete wall anchor which is identified with reference numeral 1. The concrete wall anchor has a body 2 which is elongated in a direction of its axis A and is substantially cylindrical.

The anchor body 2 has a central through going opening 3 extending in an axial direction. An upper part of the central opening 3 has a thread 4 for receiving a lower part of a driving tool for driving the concrete wall anchor into concrete. The remaining part of the central opening 3 is constructed to receive a spreading rod.

The anchor body 2 is provided with a plurality of ribs 5 which are spaced from one another in a circumferential direction. The ribs 5 extend on the outer surface of the anchor body 2 in a longitudinal direction and narrow radially outwardly, preferably to a line to form longitudinal sharp edges.

The anchor body 2 is further provided with a plurality of anchoring legs 6 which extend downwardly from a lower end of the anchor body of one piece with it and are spaced from one another in a circumferential direction. Each anchoring leg 6 has an upper part 7 and a lower part 8. The lower part 8 of each anchoring leg 6 narrows radially outwardly to a sharp point and longitudinally downwardly to a sharp edge. In a non-spread position the lower parts 8 of the anchoring legs 6 are proximal to each other and engage each other centrally.

For anchoring the concrete wall anchor 1 of the invention in a concrete wall, the driving tool 9 is screwed by its threaded lower part 10 into the threaded part of the central opening 3. The thusly assembled device is placed on a surface of concrete and blows are delivered downwardly to a wider head part 11 of the driving tool so as to forcedly displace the latter downwardly and to drive the concrete wall anchor into the concrete wall.

The driving tool 9 then is unscrewed and removed from the concrete wall anchor 1, thus releasing the central opening 3. A spreading tool 12 is then forcedly introduced into the central opening 3 by any suitable means and displaced downwardly into the area of the anchoring legs 6 and spreads the anchoring legs radially outwardly. The downwardly narrowing shape of the anchoring legs 6 forming lower sharp edges facilitates their downward penetration into the concrete during the downward driving of the concrete wall anchor 1 into the concrete, while the radially outwardly narrowing shape of the anchoring legs 6 forming sharp points facilitates their radial outward spreading into the concrete and hold in the latter.

The present invention is not limited to the details shown, since various modifications and structural changes are possible without departing from the spirit of the invention.

What is desired to be protected by Letters Patent is set forth in particular in the appended claims.

The invention claimed is:

1. A concrete wall anchor, comprising an elongated hollow body having an axis, an identical transverse cross section over its whole axial length, upper and lower ends provided with upper and lower flat surfaces extending transversely to said axis and parallel to one another, and a central cylindrical opening having an axis coaxial with the axis of the body and extending in an axial direction, a plurality of ribs projecting radially from an outer surface of the body, spaced from one another in a circumferential direction, and extending in a longitudinal direction of said body, wherein each of the ribs narrows radially outwardly to a line by two identically inclined surfaces extending over the whole axial length of the body, wherein said ribs are separated from one another in the circumferential direction by radially outwardly convex arcuate portions of the body each having a circumferential dimension which is multiple times greater than a circumferential dimension of each of the ribs; and a plurality of anchoring legs extending downwardly from said lower end of said body and spaced from one another on the circumferential direction;

wherein said cylindrical central opening of said body has a cylindrical upper part which is threaded to receive a threaded lower part of a driving tool constructed to drive the concrete wall anchor in a concrete wall, wherein said central opening has a cylindrical non-threaded remaining part located between said upper threaded part of said central opening and said anchoring legs and constructed for passing a spreading tool into an area of said anchoring legs when the concrete wall anchor is in the concrete wail and spreading said anchoring legs to reliably hold the concrete anchor in the concrete wall, wherein said anchoring legs are constructed so that in a non-spread position they abut centrally against one another at their ends spaced from said body, wherein each of said anchoring legs has a lower part which is spaced from said body and reduces radially outwardly to a point wherein said body has a cross section in a direction perpendicular to said axis, which cross section is identical over the whole axial length of said body from the upper flat surface to the lower flat surface.

* * * * *